M. LO CELSO.
FENDER FOR LOCOMOTIVES AND OTHER VEHICLES.
APPLICATION FILED SEPT. 16, 1909.
975,443.
Patented Nov. 15, 1910.
2 SHEETS—SHEET 1.
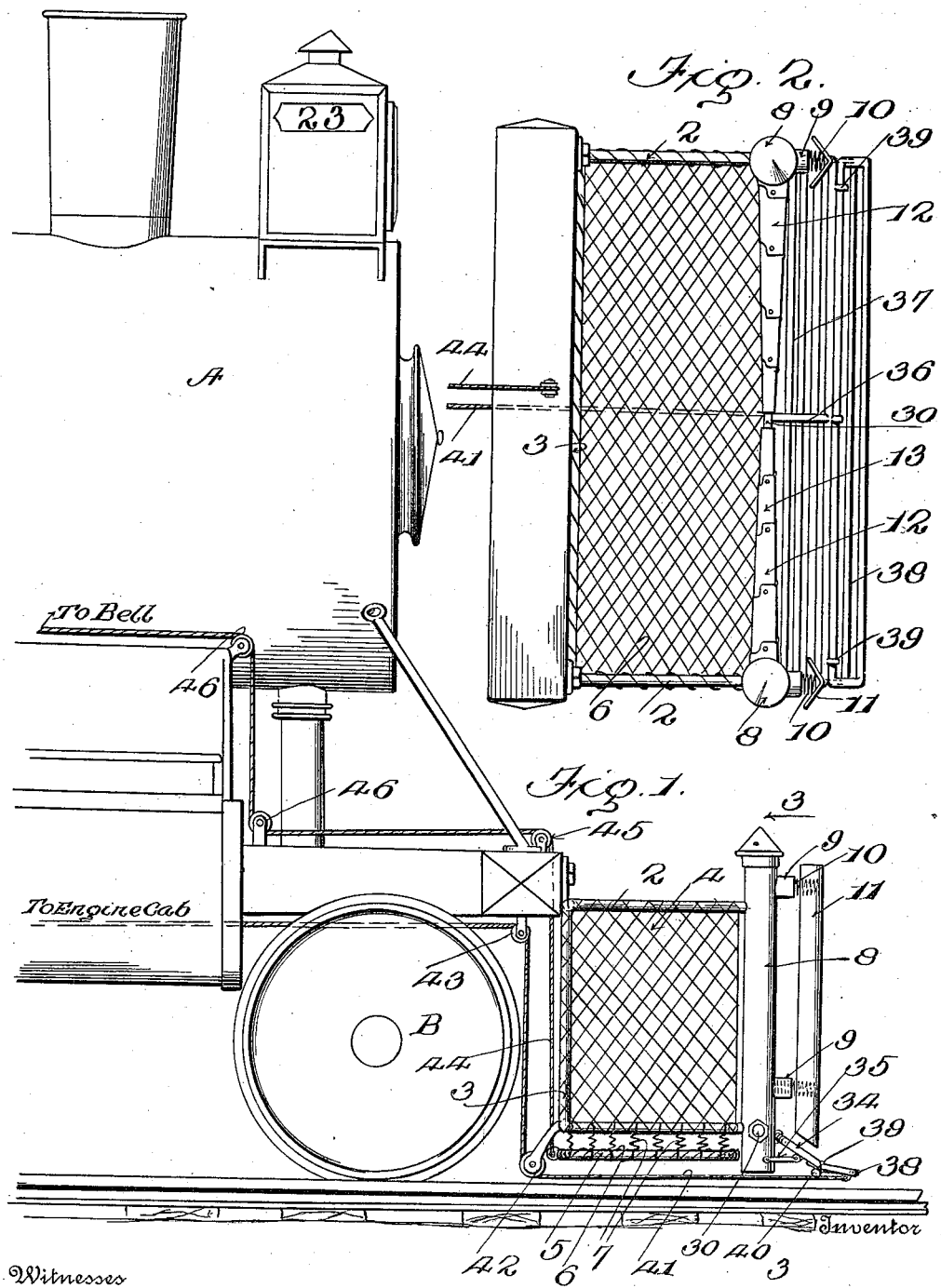
Witnesses
W. K. Woodson,
Juana M. Fallin,
Inventor
Michael Lo Celso
By R. H. N. Lacey, Attorneys M. LO CELSO.
FENDER FOR LOCOMOTIVES AND OTHER VEHICLES.
APPLICATION FILED SEPT. 16, 1909.
975,443.
Patented Nov. 15, 1910.
2 SHEETS—SHEET 2.
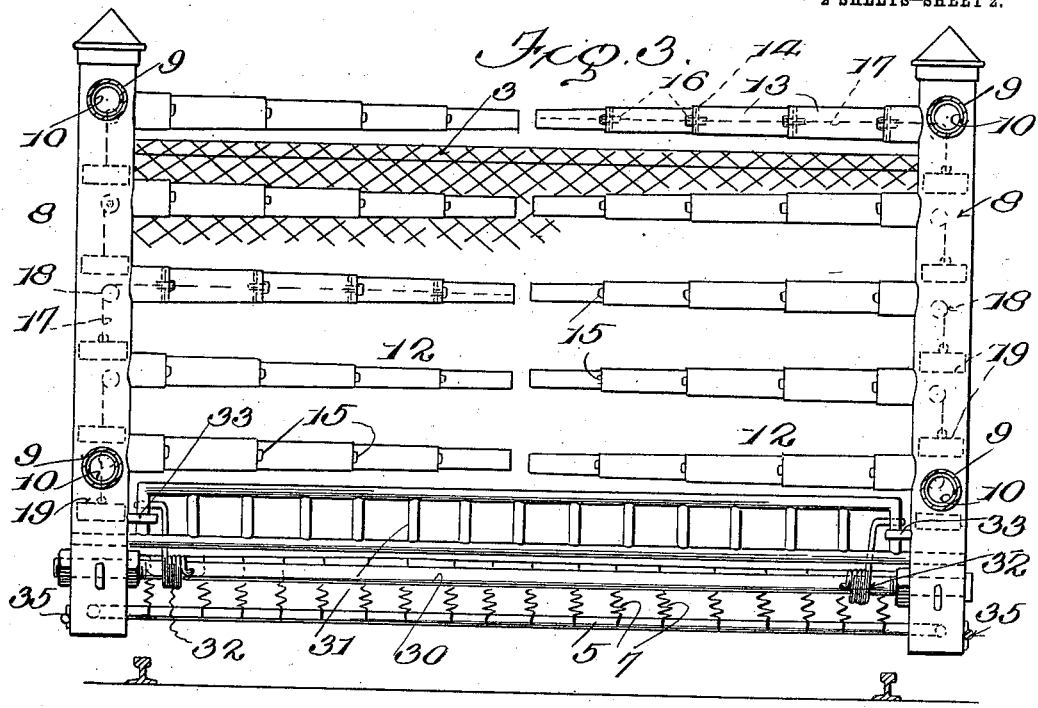
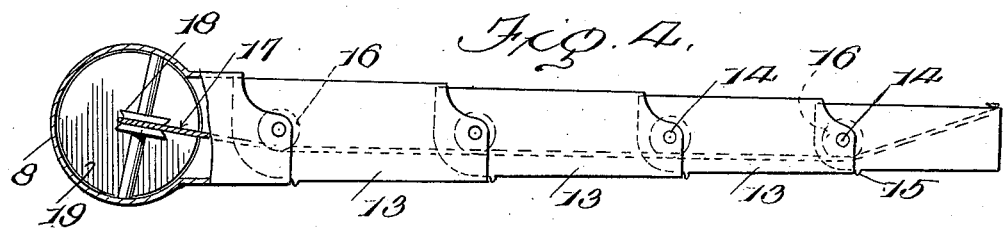
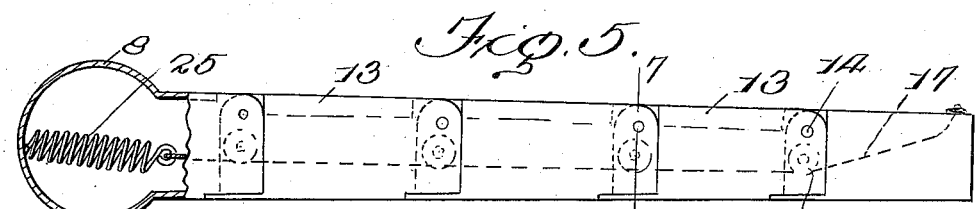
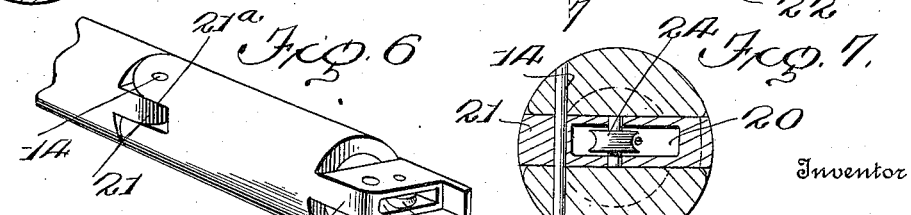
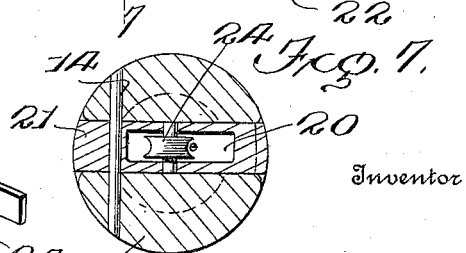

UNITED STATES PATENT OFFICE.

MICHAEL LO CELSO, OF CHICAGO, ILLINOIS.

FENDER FOR LOCOMOTIVES AND OTHER VEHICLES.

975,443.

Specification of Letters Patent. Patented Nov. 15, 1910.

Application filed September 16, 1909. Serial No. 518,078.

*To all whom it may concern:*

Be it known that I, MICHAEL LO CELSO, citizen of the United States, residing at Chicago, in the county of Cook and State of Illinois, have invented certain new and useful Improvements in Fenders for Locomotives and other Vehicles, of which the following is a specification.

My invention relates to fenders for locomotives, cars and other vehicles, the object of the invention being first to provide a fender with means whereby an object struck by the fender will be automatically retained upon the fender and prevented from falling upon the track of the car.

Another object is to provide, in combination with a fender of the kind above described, a receiver located behind the fender and adapted to catch and retain objects struck by the fender.

The ordinary fenders of cars, locomotives, etc., are deficient in that the person or object struck by the fender is either thrown directly in front of the car, or violently to one side thereof, or else, even if the person falls upon the fender, there is danger of his rolling off of the fender. Particularly is this true where the railroad train or other vehicle is going at a high rate of speed.

A still further object is to provide a means operable by the engineer, whereby the apron of the fender may be lowered at will into proximity to the road bed, so that the object or person upon the track may be scooped up upon the fender with a great degree of certainty.

A still further object is to so construct the fender that the pocket or receiving compartment at the rear end of the fender shall become depressed upon a weight being placed therein, and shall consequently ring a bell or effect any suitable signal in the cab of the engineer, thus notifying him that an object has been struck by the train and is being carried by the fender. This is particularly necessary on dark nights when, without the alarm of other signal, the engineer would be ignorant of the fact that an object had been struck.

In general terms, my invention includes a fender structure having a receptacle or pocket mounted upon the forward end of the engine or other vehicle, said compartment or receptacle being preferably sus-
tained so as to be depressible upon the reception of a weight. Attached to the front of the receptacle is a depressible apron which extends down nearly to the road bed of the track and is adapted to be depressed still further into proximity thereto. Crossing the front of the fender is a gate composed of arms or fingers which resiliently yield inward, but cannot move outward beyond their normal position. Thus, if an object is struck by the fender, or thrown into the pocket, or partially therein, the arms will yield to permit the reception of the object or person, to prevent the fall of the object or person from the fender.

For a full understanding of the invention and the merits thereof, and to acquire a knowledge of the details of construction, reference is to be had to the following description and accompanying drawings, in which:

Figure 1 is a side elevation of the front end of the locomotive with my improved fender applied thereto; Fig. 2 is a top plan view of the fender and a portion of the locomotive; Fig. 3 is a transverse section on the line 3—3 of Fig. 1 the pivoted section at the lower edge of the fender apron being removed; Fig. 4 is an enlarged detail view of one form of jointed arm, the supporting post being in section; Fig. 5 is a like view of the other form of arm; Fig. 6 is a detail fragmentary perspective of the form of arm shown in Fig. 5; and, Fig. 7 is a section, enlarged, on the line 7—7 of Fig. 5.

Corresponding and like parts are referred to in the following description and indicated in all the views of the drawings by the same reference characters.

Referring to these figures, A designates a locomotive engine of any suitable character, but with the cow-catcher removed. By removing the cow-catcher, considerable space is afforded ahead of the pilot wheels B of the engine, for the accommodation of my improved fender.

2 designates rectangular side frames, preferably of tubular material, and 3 a rectangular rear frame formed preferably in one piece with the side frames. The side and rear frames thus form an oblong compartment or receptacle open at its front and top, but closed at the sides and at the rear. These frames may be supported in any suitable manner upon the frame of the locomotive. The frames are preferably covered with wire netting 4. The bottom of the compartment consists of a metallic frame 5, across which wire netting 6 is stretched and supported from the lower ends of the frames 2 and 3 by means of coil springs 7, so that the bottom of the compartment will become depressed under the reception of a weight, for the purpose of sounding an alarm, as will be later described.

Mounted upon the forward ends of the frames 2 are the opposed gate posts 8 which have sockets 9 projecting forwardly from their upper and lower ends, these sockets supporting within them the coil springs 10. The ends of the springs 10 are attached to V-shaped shields 11 which extend the length of the gate posts, and by means of the coil springs are supported resiliently in front of the posts. The coil springs not only permit a movement of the shields 11 toward the gate posts, but also permit the shields to resiliently yield or turn laterally. Thus an object struck by the shields, will be deflected either to one side of the fender and beyond the locomotive, or will be guided into and against the gates of the fender.

Attached to the gate posts and extending transversely across the front of the fender, are a plurality of arms 12. These are yieldingly supported upon the frames so that they will move inward into the pocket or compartment behind, but will not move outward beyond the position shown in Fig. 2. Preferably these arms are formed of sections 13, jointed to each other, each section being capable of an independent turning movement upon its pivot 14, so that each arm has a jointed movement similar to the finger of a hand, and so that the arm will yield flexibly and resiliently along its whole extent when struck by an object, thus permitting the object to pass into the pocket with the least resistance. These arms may be made either solid or tubular. In Fig. 4 I show the arms as made of tubular metallic sections, each section being tapered, and the sections projecting one into the other, the sections being pivoted by pivot pins 14. Each section has upon it, at its base, the projecting lug 15 which contacts with the edge of the next preceding section. This lug 15 acts as a stop to prevent the outward movement of any section relative to the next succeeding section, but of course permitting the inward movement of the section. Each of the pivot pins 14 carries upon it a small pulley wheel 16, over which passes a cord 17 which is attached at one extremity to the end of the end section and passes over a pulley 18, rotatably mounted within the post 8. This cord passes over the pulley 18 and is then attached to a weight 19. There are as many cords and weights as there are arms, and hence each arm will move independently of the other arms. It will be seen that the tendency of the cord and weight 17 and 19 will be to hold the arms in the projected position shown in Fig. 2, and to resist slightly any inward movement of the arms or turning movement of the sections. The weights are relatively small, however, and permit the sections to be easily moved inward, but are sufficient to return them to the normal position, as soon as pressure upon the arms is relieved.

In Figs. 5, 6 and 7, I show a different construction of the arm 12, the sections 13 being made practically solid and simply having a longitudinal passage 20 through them for the accommodation of the actuating cord. Each section, at one end, is formed with a knuckle 21 which extends into a recess formed in the next adjacent section, the pivot pin 14 being passed through the knuckle and recess. Thus, one section is jointed to the next adjacent section. Each of the knuckles 21 is provided with a small pulley 24 which is equivalent to the pulley 16 in Fig. 4, over which the cord 17 passes. It will be seen that the pivotal points of the sections are such that when the sections are flexed, the cord 17 will be tightened. The extremity of the cord is attached to a spring 25 which is fastened at its other end to the inner face of the adjacent post 8, as seen in Fig. 5. Thus, in Fig. 4, the sections are weight-actuated, while in Fig. 5 they are spring-actuated. Both forms, however, provide for a resiliently yielding sectional arm.

Extending transversely between the posts 8, near the lower ends thereof, is the cross bar 30 which acts to brace the lower ends of the posts and also provides means for the support of the apron, as will be later described. Pivotally mounted upon the posts 8, just above the cross bar 30, is the yielding strip forming the door 31. This strip or door may be either solid or of openwork material, as shown. Each end of the door is engaged by a spring 32 which is mounted upon the cross bar 30. The extremity of this spring is outwardly bent and engages the rear face of the door, near its upper edge, thus holding the door or strip in its upright or closed position, but permitting the door to be turned backward and downward upon the impact of an object. Stops 33 projecting from the posts 8, limit the forward movement of the door, so that it is normally held in its vertical position.

Rigidly attached to the lower ends of the posts 8, and projecting diagonally downward and forward therefrom, are the supporting bars 34 which are maintained in position by the braces 35. The supporting bar 36 is also attached to the cross bar 30, as shown in Fig. 2. Supported on these bars 34 and 36 are the small transverse apron bars 37. Hinged to eyes on the small transverse bars 37 is the apron section 38, also composed of spaced transverse bars attached rigidly to each other, at their ends and hingedly connected to the bars 37 at the eyes 39. Springs 40 are mounted beneath the bars 34, the free ends of the springs engaging with the movable apron section 38 and forcing it upward. To the outer edge of the movable apron section 38 is attached a cord or flexible connection 41 which extends rearward and over a pulley 42 supported upon the frame bars 3. This cord 41 passes from the pulley 42 to a pulley 43, and from thence to the cab of an engine. It is there connected to a handle or other operating mechanism (not shown), whereby the cord may be pulled upon to draw down the outer edge of the movable section of the apron into proximity to the road bed.

A cord 44 is attached to the resiliently supported bottom section of the receptacle or retaining compartment, and extends upward and over a pulley 45 and from thence over directing pulleys 46 to a signal bell or other alarm mechanism (not shown) located within the cab of the engine. It will be seen that any depression of the bottom of the basket or receptacle will cause the bell or signal to be operated, thereby notifying the engineer that the fender has struck some object which is deposited in the basket or receptacle.

The operation of my fender is as follows: Under normal circumstances, the arms 12 are in the position shown in Fig. 2, that is, extending transversely across the open front of the receptacle, the lower apron section 38 being resiliently supported above the road bed. It will be obvious, now, that upon striking the fender, the object will be deflected either entirely away from the fender when striking an outer face of one of the shields 11, or will be deflected into the fender and against the arms 12, whereupon the arms and the door 31 will yield so that the object will fall into the receptacle. As soon as the arms have been released, they will return to their original position, preventing the object from falling out of the receptacle. It will be obvious that because of the jointed construction of the arms, (each joint of which yields independently) even though the arms do not turn in fully and completely, yet they will act to retain the object within the receptacle, and that they will form a hand hold for a person thrown partially into the receptacle or retaining compartment. Under ordinary circumstances, it is not desirable that the forward end of a fender apron should extend down into very close proximity to the road bed, but it is clearly desirable that, when it is seen that an accident is inevitable or probable, the forward end of the fender apron shall be depressed so that the object may be scooped up by the fender. It is for this purpose that I provide the cord 41, whereby, when the engineer sees that an accident is imminent, the forward end of the fender may be depressed, as before described.

While I have stated the preferable details of my invention, I do not wish to be limited to the exact construction illustrated, or the details thereof, inasmuch as the principle of my invention may be embodied in a number of different constructions.

Having thus described the invention, what I claim is:

1. A fender for vehicles, including a receptacle having an open front, a plurality of resilient arms extending across the open front of the receptacle and adapted to be moved inward upon the impact with an object.

2. A fender for vehicles, including a receptacle having an open front, and a plurality of yielding arms mounted to extend transversely across the open front, said arms being composed of a plurality of joints, the joints turning resiliently inward.

3. A fender for vehicles, including a receptacle, open at its front, a plurality of jointed arms extending across the front of the receptacle and yieldable inwardly, means for returning the arms to their original position, and stops for preventing a forward movement of the arms beyond their original position.

4. A fender for vehicles, including a receptacle having an open front, a plurality of arms mounted transversely across the open front of the receptacle, each arm being composed of a plurality of jointed sections pivoted to each other for an inwardly turning movement, means engaging with all of the jointed sections for yieldingly holding them in alinement, and stops for preventing the forward movement of the jointed sections out of alinement.

5. A car fender including a receptacle having an open front, a plurality of arms extending across the receptacle from opposite sides, each arm composed of a plurality of tubular jointed sections, a cord for each arm, extending from one end to the other through the jointed sections and attached to the outermost jointed sections, and means for keeping the cord under tension.

6. A fender including a receptacle, open on the front, a plurality of arms crossing the open front of the receptacle, each arm composed of a plurality of tubular sections, jointed to each other, stops at the base of each section contacting with the end of the next adjacent section and preventing an outward movement of the arms out of alinement with each other, but permitting the inwardly turning movement of the arms, a cord extending through all the sections and to the outermost section, and means mounted beyond the base section for keeping a yielding tension on said cord.

7. A car fender including a receptacle having an open front, hollow posts at the front corners of the receptacle, a series of arms pivoted to the posts for an inward turning movement and crossing the front of the receptacle, each arm being composed of a plurality of tubular sections, jointed to each other, and a cord for each arm, attached to the outer section and passing through the other sections and into said posts, pulleys mounted within the posts, over which said cords pass, and a weight for each of said cords, tensioning the cords and holding the sections in alinement with each other.

8. A fender including a receptacle having an open front, a gate closing the front of the receptacle and yieldable inward upon impact with an object, and deflectors mounted in front of and on either side of the gate, comprising V-shaped shields resiliently mounted to turn laterally.

9. A car fender including a receptacle, open at its front, opposed posts at the front corners of the receptacle, inwardly yielding arms mounted upon said posts and projecting across the front of the receptacle, coil springs projecting from the posts, and V-shaped deflecting shields mounted on the coil springs and directly in front of the posts.

10. A car fender including a receptacle, open at its front, a gate closing the front of the receptacle and adapted to yield inwardly, and an apron extending downward from the front of the receptacle, the lower portion of said apron being yieldable downwardly, a spring for holding said lower portion raised, and a connection attached to the yielding section for depressing it toward the road bed.

11. A fender including a receptacle, open at its front, opposed posts located at the corners of the receptacle, arms projecting from each of the posts and extending transversely across the front of the receptacle, said arms being composed of jointed sections yieldable inwardly, means for yieldingly holding the sections in alinement with each other, stops for preventing the sections from turning outward, a rigid apron extending downward and forward from a point beneath said arms, a lower movable apron pivoted to the rigid apron, springs for holding the lower edge of the lower apron raised, and a flexible connection passing over pulleys and adapted when pulled to depress the forward edge of the lower apron.

12. A fender including a receptacle, open at its front, opposed posts at the front corners of the receptacle, a plurality of arms mounted on the posts and extending transversely across the front of the receptacle, each being formed of jointed sections, means for yieldingly holding the arms in their projected position, an apron extending downwardly and forwardly, the upper edge of the apron being located below the arms and supported upon said post, and a pivoted strip forming a door extending transversely between the posts, said strip being pivoted at its opposite ends to the post and yieldable inwardly, springs for holding the strip in alinement with the posts, and stops limiting the outward movement of the said strip.

In testimony whereof I affix my signature in presence of two witnesses.

MICHAEL LO CELSO. [L. s.]

Witnesses:
   Frank D. Read,
   Ouofrio Mazza.